United States Patent [19]

Timko

[11] Patent Number: 5,612,911
[45] Date of Patent: Mar. 18, 1997

[54] CIRCUIT AND METHOD FOR CORRECTION OF A LINEAR ADDRESS DURING 16-BIT ADDRESSING

[75] Inventor: Mark A. Timko, Portland, Oreg.

[73] Assignee: Intel Corporation, Santa Clara, Calif.

[21] Appl. No.: 444,205

[22] Filed: May 18, 1995

[51] Int. Cl.$^6$ ........................................... G06F 7/50
[52] U.S. Cl. ............................................. 364/768
[58] Field of Search .................... 364/768, 786; 395/421.1

[56] References Cited

U.S. PATENT DOCUMENTS

| | | | |
|---|---|---|---|
| 3,299,261 | 1/1967 | Steigerwalt, Jr. | |
| 3,515,344 | 6/1970 | Goldschmidt et al. | |
| 4,272,828 | 6/1981 | Negi et al. | 364/768 |
| 5,204,953 | 4/1993 | Dixit | 395/421.1 |
| 5,233,553 | 8/1993 | Shak et al. | 364/768 |
| 5,418,736 | 5/1995 | Widigen et al. | 364/786 |
| 5,504,698 | 4/1996 | Su | 364/768 |
| 5,517,440 | 5/1996 | Widigen et al. | 364/786 |
| 5,522,085 | 5/1996 | Harrison et al. | 395/800 |

OTHER PUBLICATIONS

"The Metaflow Architecture" by Val Popescu, et al. *IEEE Micro* (Jun. 1991) pp. 10–13, 63–73.

*Primary Examiner*—Tan V. Mai
*Attorney, Agent, or Firm*—Blakely, Sokoloff, Taylor & Zafman

[57] ABSTRACT

An integrated circuit device performing arithmetic operations on a plurality of digital inputs to produce an Effective Address and a Linear Address in parallel. The integrated circuit device comprises a first, second and third circuit. The first circuit includes a first adding circuit performs logical operations on the plurality of digital inputs (segment address, scaled index, displacement and segment base) to produce a first plurality of output signals for use in producing the Effective Address and another plurality of output signals to produce an uncorrected Linear Address. The uncorrected Linear Address, if accurate, should be equivalent to the arithmetic sum of the Effective Address and the segment base. Since the first circuit may produce an inaccurate uncorrected Linear Address as detected by a second circuit, the integrated circuit includes a third circuit, controlled by the second circuit, to subsequent modify the uncorrected Linear Address to obtain the Linear Address if the arithmetic sum of the Effective Address and the segment base is not equal to the uncorrected Linear Address.

46 Claims, 5 Drawing Sheets

CIRCUIT AND METHOD FOR CORRECTION OF A LINEAR ADDRESS DURING 16-BIT ADDRESSING

CROSS-REFERENCES TO RELATED APPLICATIONS

The named inventor of the present application has filed co-pending United States patent applications entitled "An Apparatus and Method for Optimizing Address Calculations" (application Ser. No. 08/409,502) and "Apparatus and Method for Addition Based on Kogge-Stone Parallel Algorithm" (application Ser. No. 08/365,204). These U.S. applications are owned by the same assignee of the present application.

BACKGROUND OF THE INVENTION

1. Field of the Invention

The present invention relates to the field of electronic circuits. More particularly, the present invention relates to a circuit for accurately calculating address information with minimal delay.

2. Description of the Prior Art

It is fundamental to the operations of microprocessors and those electronic devices incorporating microprocessor(s) to support digital (i.e., binary) addition of at least two digital inputs. Normally, microprocessors employ integrated circuits which perform various arithmetic or logical ("bitwise") operations on multiple digital inputs for calculating digital sums and other logical functions. For example, an address generation unit ("AGU") is employed within the microprocessor in order to calculate an Effective Address ("EFF_ADDR"), which is used for checking the memory address offset for addressing violations and a Linear Address ("LIN_ADDR") for accessing virtual memory locations. Both the Effective and Linear Addresses are calculated according to the following equations by using a combination of carry-save adders ("CSAs") and carry propagate adders ("CPAs") in parallel to "add" certain digital inputs; namely, a base address ("S1"), an index multiplied by any scaling factor ("S2"), a displacement ("S3") and subsequently, a segment base ("S4").

$$EFF\_ADDR = S1+S2+S3; \text{ and} \qquad \text{Eqn. 1}$$

$$LIN\_ADDR = EFF\_ADDR + S4, \text{ where} \qquad \text{Eqn. 2}$$

"+" is an operator representing a normal arithmetic addition.

Referring to FIG. 1, an conventional architecture of addressing circuitry 100 of the AGU, implemented within conventional x86 Intel® Microprocessor Architecture, is shown. The addressing circuitry 100 is capable of producing the Effective and Linear Addresses to support a selected addressing mode. More specifically, the addressing circuitry 100 may be configured to operate in a 16-bit addressing mode in order to support older addressing architectures and application programs relying on 16-bit addressing. This occurs when the S1, S2 and S3 inputs are 16-bits in length. However, the addressing circuitry 100 also may be configured to operate in a 32-bit addressing mode to support current application programs relying on 32-bit addressing.

In order to correctly calculate the Linear Address, the conventional addressing circuit 100 first calculates the Effective Address by inputting digital inputs S1, S2 and S3 via 32-bit-wide communication lines 105–107 into a 3:2 carry-save adder ("3:2 CSA") 110. The 3:2 CSA 110 produces sum signals for calculating the Effective Address, namely E_SUM$_0$, E_SUM$_1$ through E_SUM$_{31}$ (collectively referred to as "E_SUM$_{31-0}$" signals) via communication lines 115. These E_SUM$_{31-0}$ signals are bitwise sums produced by adding corresponding bits of the S1, S2 and S3 inputs. In addition, the 3:2 CSA 110 produces carry signals, i.e., E_CARRY$_0$–E_CARRY$_{31}$, corresponding to E_SUM$_0$–E_SUM$_{31}$, which are collectively referred to as "E_CARRY$_{31-0}$" signals, via communication lines 116.

The E_SUM$_{31-0}$ and E_CARRY$_{31-0}$ signals are input into a conventional adder 120 (e.g., a carry propagate adder, carry ripple adder, carry look-ahead adder, Kogge-Stone adder and the like) which calculates the Effective Address. The Effective Address is transferred through communication lines 121 which are separately routed to different components. As shown, sixteen (16) communication lines 122 associated with the least significant 16-bits of the Effective Address (hereinafter referred to as "EA[15:0]") are coupled directly to a second conventional adder 130 while sixteen (16) communication lines 123 associated with the most significant sixteen (16) bits of the Effective Address (hereinafter referred to as "EA[31:16]") are routed to a masking logic unit 125.

The masking logic unit 125 is combinatorial logic (not shown), for example, sixteen logic gates with AND gate functionality configured in parallel so that one input of each logic gate is coupled to different communication lines 123 and the other input to a common, active-low $\overline{MASK}$ line 126. If the addressing circuitry 100 is operating in 16-bit addressing mode, the $\overline{MASK}$ line 126 is asserted based on control signals resulting from the operation being performed. This causes EA[31:16] to be "masked" (i.e., sets each of these bits to logic level "0" according to standard TTL logic) before being output to the second conventional adder 130 via communication lines 127. Such masking is done to ensure that no carries are generated or propagated from the addition of S1, S2 and S3 inputs which would effect the value of t Linear Address. However, in 32-bit addressing mode, the $\overline{MASK}$ line 126 is deasserted so that the true bit representation of EA[31:16] is output to the second conventional adder 130.

In either of the above cases, the masking logic unit 125 outputs a selectively masked sum representing EA[31:16], in synchronism with EA[15:0], into the second conventional adder 130. The second conventional adder 130 receives the S4 input, typically a 32-bit address segment base, via communication lines 131 and calculates the Linear Address therefrom in accordance with Eqn. 2 listed above.

Clearly, this conventional addressing scheme requires a three step process for calculating the Linear Address for 16-bit addressing; namely, (i) calculating the Effective Address; (ii) selectively masking EA[31:16] if operating in 16-bit addressing mode; and (iii) adding the Effective Address or alternatively EA[15:0] and the masked EA[31:16] with the segment base. As a result, these sequential steps ensure that no carries are generated from the Effective Address by clearing those bits associated with EA[31:16]. Such carries could effect the calculated value of the Linear Address. However, as operational speed of the processor increases, this architecture for serially calculating Effective and Linear Addresses fails to meet necessary timing constraints.

Thus, it would be advantageous to calculate both the Effective and Linear Addresses in parallel while still supporting 16 or 32-bit addressing. As a result, parallel calculations would have significant impact on the overall performance of the processor.

SUMMARY OF THE INVENTION

The present invention relates to an integrated circuit generating an Effective Address and a corresponding Linear Address in parallel. The integrated circuit comprises a first circuit which concurrently generates the Effective Address and an uncorrected Linear Address. This is accomplished by performing arithmetic operations on a plurality of signals input into the first circuit; namely a segment address, a scaled index, a displacement and a segment base.

It is contemplated that the uncorrected Linear Address, if accurate, should be equivalent to the arithmetic sum of the Effective Address and the segment base. Since the first circuit may produce an inaccurate uncorrected Linear Address as detected by a second circuit, the integrated circuit includes a third circuit, controlled by the second circuit, to subsequent modify the uncorrected Linear Address to obtain the Linear Address if the arithmetic sum of the Effective Address and the segment base is not equal to the uncorrected Linear Address as indicated by signals propagating through various communication lines.

BRIEF DESCRIPTION OF THE DRAWINGS

The features and advantages of the present invention will become apparent from the following detailed description of the present invention in which.

DETAILED DESCRIPTION OF THE INVENTION

An address correction circuit for accurately calculating a Linear Address during either 16-bit or 32-bit addressing modes is described below. In the following description, for purposes of explanation, specific details are set forth in order to provide a thorough understanding of the present invention. However, it is apparent to one skilled in the art of circuit design that the present invention may be practiced by any integrated circuit, especially processors, without these specific details. In other instances, well known operations, functions and devices are not shown in order to avoid obscuring the present invention.

In the detailed description, a number of terms are frequently used to describe certain logic circuits and define certain representations herein. For example, a "bit slice" or "slice" is defined as all logic within a circuit which produces digital signals associated with a particular bit (e.g., slice "i" of the combined CSA produces $E\_SUM_i$, $E\_CARRY_{i+1}$, $L\_SUM_i$ and $L\_CARRY_{i+1}$ outputs). An "adder" is defined as any logic performing arithmetic operations on two inputs to produce an "added" result such as a carry propagate adder, carry ripple adder, carry look-ahead adder, a Kogge-Stone adder and the like. Also, the representation "x:y" indicates that a digital device (e.g., adder) has "x" inputs and "y" outputs.

Moreover, some portions of the detailed description which follow are presented in terms of logical representations of logical operations which are used by those skilled in the art to effectively convey the substance of their work to others skilled in the art. These logical representations require physical manipulation of various electrical or magnetic signals capable of being stored, transferred, combined, compared or otherwise manipulated.

Figure 2:
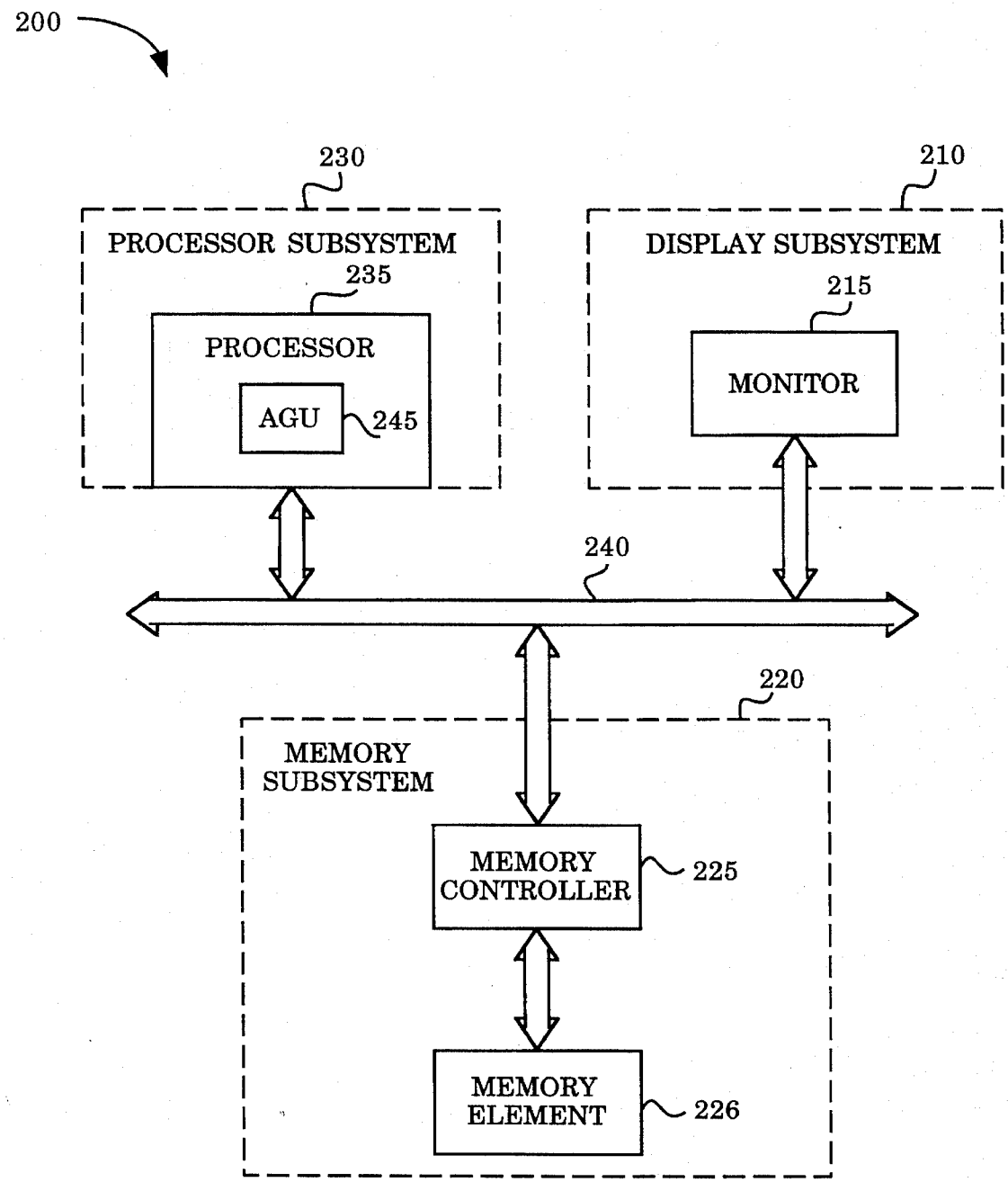
FIG. 2 is an illustrative embodiment of a computer system comprising at least one processor employing the present invention.

Referring to FIG. 2, an embodiment of a computer system 200 employing the present invention is illustrated. The computer system 200 comprises a display subsystem 210, a memory subsystem 220 and a processor subsystem 230, all of which being coupled together by a bus 240 including address, data and control lines. The display subsystem 210 enables information to be displayed on a monitor 215 such as a cathode ray tube, flat panel display or any other monitor device.

The memory subsystem 220 includes a memory controller 225 providing an interface for controlling access to at least one memory element 226 such as dynamic random access memory ("DRAM"), read only memory ("ROM"), video random access memory ("VRAM") and the like. The memory element 226 stores information for use by the processor subsystem 230.

The processor subsystem 230 includes at least one processor 235 including a number of integrated circuits, including but not limited to, an address generation unit ("AGU") 245. The AGU 245 is configured to perform addressing operations for the processor. The AGU 245 further includes an address correction circuit (not shown) which is used to concurrently calculate the Effective and Linear Addresses and correct for any errors caused by such concurrent address calculations.

Figure 3:
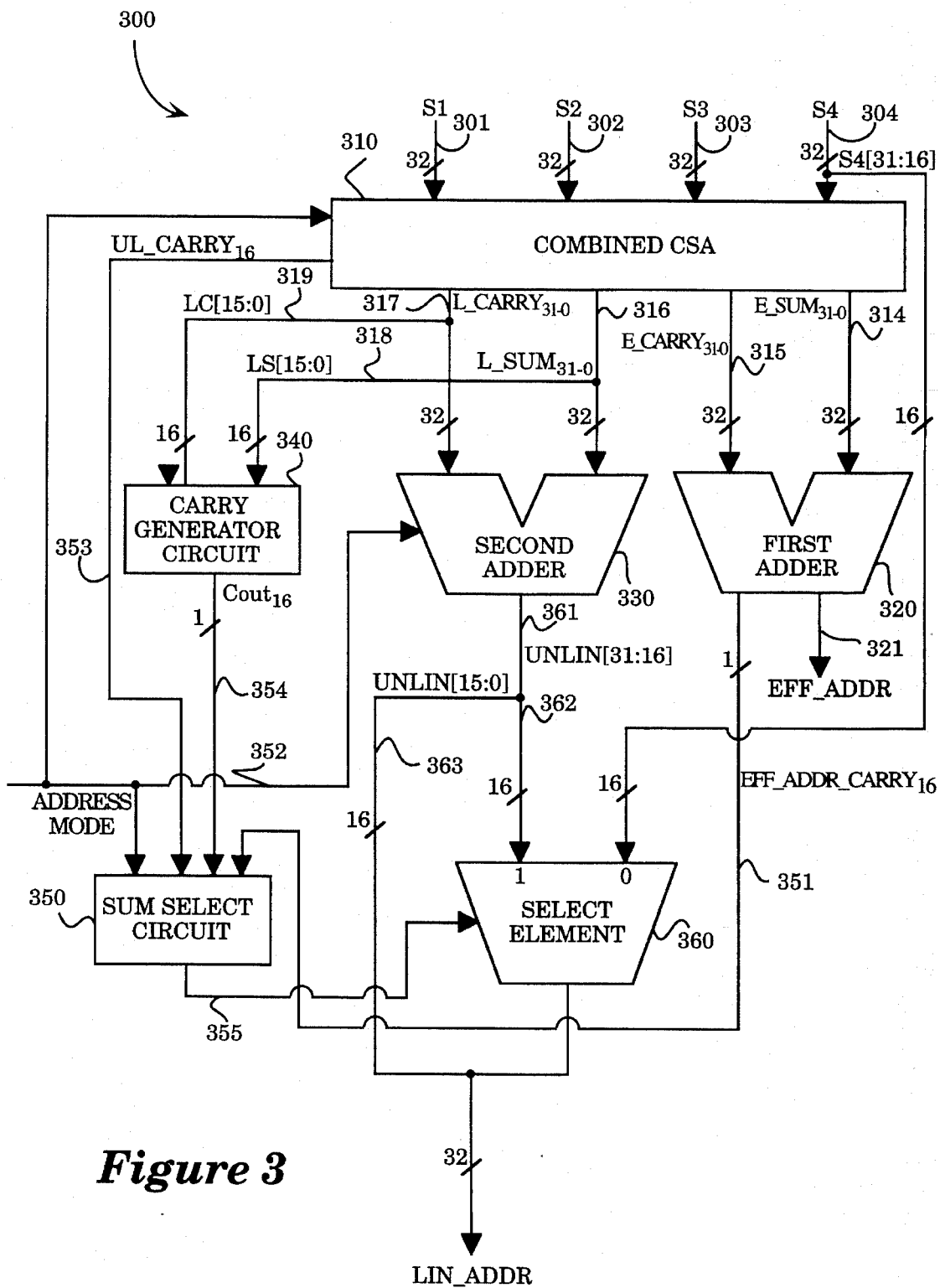
FIG. 3 is an illustrative embodiment of address correction circuitry employed within the addressing generation circuit of the processor of FIG. 2.

Referring to FIG. 3, an illustrative embodiment of the address correction circuit is shown. This address correction circuit 300 comprises a plurality of elements which collectively produce an Effective Address and a Linear Address in parallel. Preferably, these elements include an adder element 310 receiving, as parallel inputs, a base address ("S1"), an index multiplied by any scaling factor ("S2"), a displacement ("S3") and a segment base ("S4"); a first and second adders 320 and 330; a carry generator circuit 340; a sum select circuit 350; and a select element 360. As shown, the adder element is preferably a 4:2/3:2 CSA ("combined CSA") 310 which is described in detail the co-pending application entitled "An Apparatus And Method For Optimizing Address Calculations" (Ser. No. 08/409,502) incorporated herein by reference. It is contemplated, however, that alternative designs of the adder element are available such as implementing a 3:2 CSA and a 4:2 CSA, both of which are coupled to those communication lines transferring the S1, S2 and S3 ("S1–S3") inputs. However, for clarity sake, we shall describe the address correction circuit 300 implemented with the combined CSA 310.

Referring still to FIG. 3, the combined CSA 310 receives S1–S4 inputs in parallel through communication lines 301–304, respectively. These inputs typically are 32-bit double words, but the S1–S3 inputs may be 16-bit words. The combined CSA 310 produces outputs $E\_SUM_{31-0}$, $E\_CARRY_{31-0}$, $L\_SUM_{31-0}$ and $L\_CARRY_{31-0}$ (representative of the signals as indicated above) through communication lines 311–314, respectively. The logical representations of these digital outputs for an arbitrary bit "i" are shown in Table A below, where bitwise logical OR, AND, XOR and XNOR operators are represented by "| |", "&&", "XOR" and "XNOR" and $C_i$ represents a global carry output.

TABLE A

| | Outputs of the Combined CSA |
|---|---|
| SIGNAL | LOGICAL VALUE |
| $E\_SUM_i$ | $S1_i$ XOR $S2_i$ XOR $S3_i$ |
| $E\_CARRY_{i+1}$ | ($S1_i$ XNOR $S2_i$) && $S1_i$ \| \|($S1_i$ XOR $S2_i$) && $S3_i$ |
| $L\_SUM_i$ | $S1_i$ XOR $S2_i$ XOR $S3_i$ XOR $S4_i$ XOR $C_i$, |
| $L\_CARRY_{i+1}$ | ($S4_i$ XOR $S1_i$ XOR $S2_i$ XOR $S3_i$) && $C_i$ \| \| ($S4_i$ XNOR $S1_i$ XNOR $S2_i$ XNOR $S3_i$) && $S4_i$ |
| $C_i$ | ($S1_{i-1}$ XNOR $S2_{i-1}$) && $S1_{i-1}$ \| \| ($S1_{i-1}$ XOR $S2_{i-1}$) && $S3_{i-1}$ |

Figure 1:
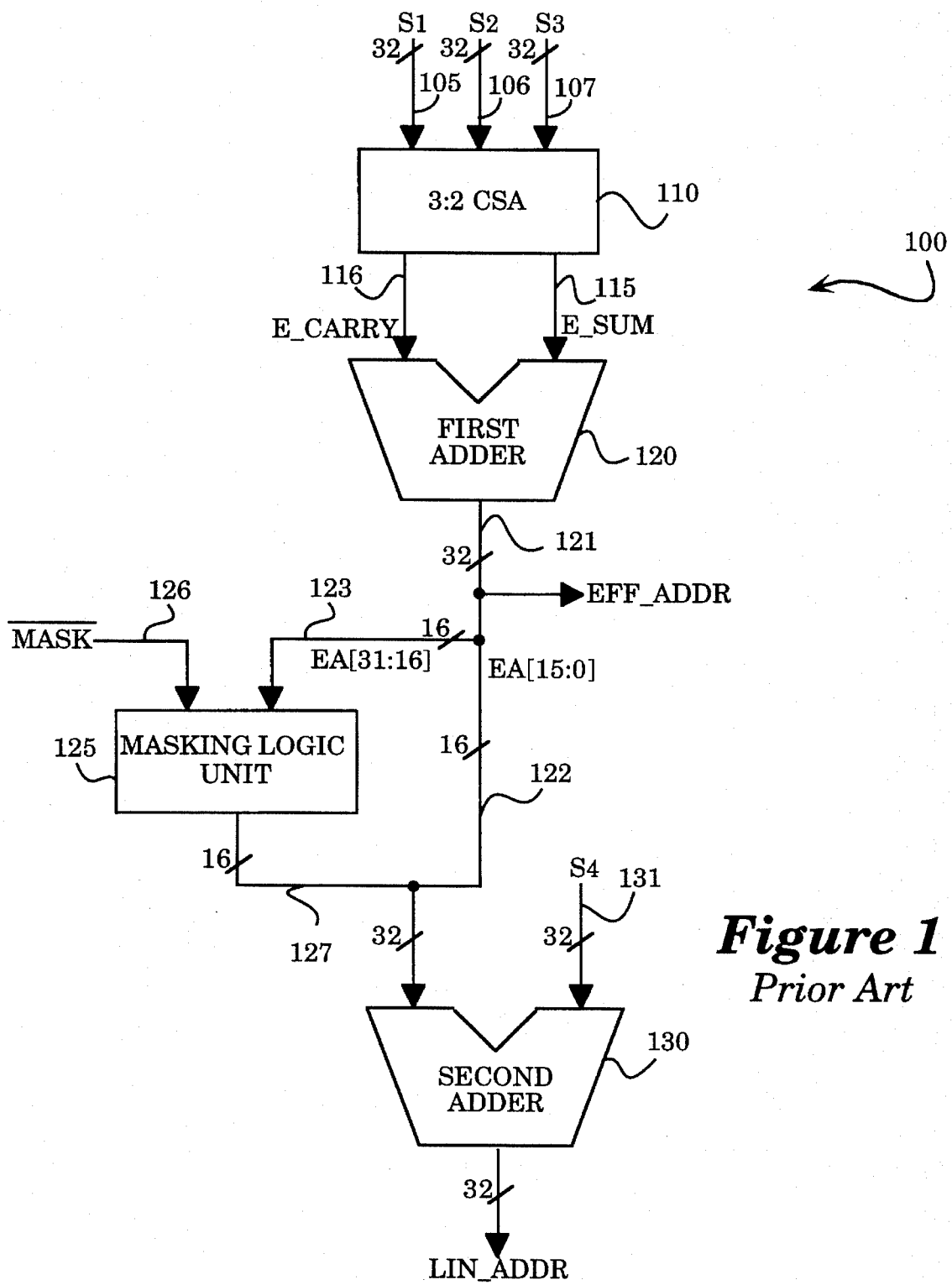
FIG. 1 illustrates a conventional addressing circuit utilizing a 3:2 CSA in combination with conventional adders and a masking logic unit in order to produce an Effective Address and subsequently a Linear Address.

The combined CSA 310 calculates both the Effective and Linear Addresses in parallel, unlike the conventional addressing circuit of FIG. 1 which calculates the Linear Address after calculating the Effective Address (as shown in Eqn. 2 above). However, parallel calculations of the Effective and Linear Addresses during 16-bit addressing mode requires address correction in situations where miscalculation of the Linear Address would occur, such as when the addition of the S1–S3 inputs would generate or propagate a carry output signal possibly effecting the logical value of bit16–bit31 of the Linear Address. These situations are illustrative of a "bad" carry (see Table C below) in which the masking logic unit 125 of FIG. 1 would have been used to "mask" incorrect carry outputs signals for correct calculation of the Linear Address.

The address correction circuit 300 may be easily configured to overcome the first situation (i.e., generation) by implementing a "mask" gate to a bit slice of the combined CSA 310 to mask an internal version of the $E\_CARRY_{16}$ output during 16-bit operations. However, it is impossible to detect propagation of a carry output signal through addition of the S1–S4 inputs to assert the $L\_CARRY_{16}$ output when concurrent calculation of both the Effective and Linear Addresses are being performed. Instead, such propagation may be detected subsequent to initial calculations of the Linear Address by monitoring a carry signal "EFF_ADDR_CARRY$_{16}$" of the sixteenth bit of the Effective Address. However, the address correction circuit 300 initially must calculate the Linear Address according to one of two assumptions and correct the Linear Address if the chosen assumption proves false. The two possible assumptions are the following of which the second assumption is chosen in our detailed description:

(1) the Effective Address added to the segment base ("S4 input") does not produce a carry output signal into bit16 of the Linear Address (i.e., a carry did not generate or propagate into bit16 of the second adder); or (2) the Effective Address added to the segment base produces a carry into bit 16 (i.e., a carry generated or propagated into bit16 of the second adder).

Figure 4:
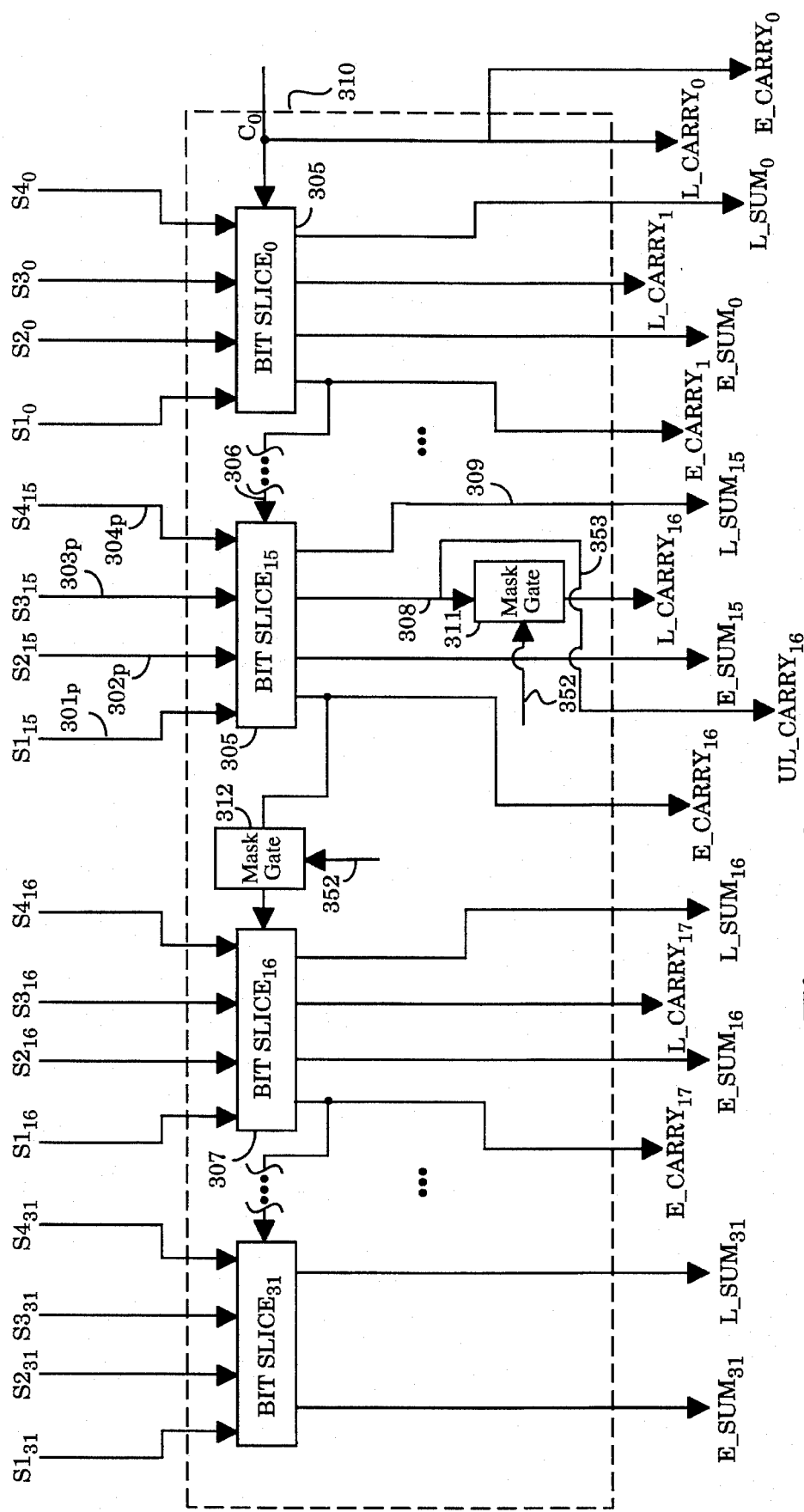
FIGS. 4 is an illustrative block diagram of individual bit slices employed within the combined CSA of FIG. 2.

Referring now to FIG. 4, a bit slice orientation of the combined CSA 310 is illustrated to support 32-bit data paths, although it is obvious that any other arbitrary bit widths may be supported by the present invention. The combined CSA 310 includes thirty-two (32) bit slices oriented in parallel with one another. For example, "slice15" 305 receives "bit15" of the S1–S4 inputs through communication lines 301p–304p. This bit slice 305 further receives a carry "$E\_CARRY_{15}$" output via communication line 306 as a global carry from an adjacent bit slice (i.e., slice14) to be used in calculating $L\_CARRY_{16}$ and $L\_SUM_{15}$ outputs transmitted through communication lines 308 and 309, respectively. Each of these bit slices calculates its corresponding $E\_CARRY_{i+1}$, $E\_SUM_i$, $L\_CARRY_{i+1}$ and $L\_SUM_i$ bitwise outputs in an identical manner.

For the slice15 305, a first mask gate 311 is employed within the combined CSA 310 and coupled to the communication line 308 and a communication line 352 indicating the type of address mode. The communication line 352 transmits a logic "low" signal if operating in 16-bit addressing mode or a logic "high" signal if in 32-bit addressing mode. If the address mode indicates 16-bit addressing, the first mask gate 311 deasserts the $L\_CARRY_{16}$ output transmitted into the second adder 330. However, an unmasked $L\_CARRY_{16}$ ("$UL\_CARRY_{16}$") output is transmitted to the sum select circuit through a communication line 353.

Furthermore, between the slice15 305 and a slice16 307, a second mask gate 312 deasserts a carry output during 16-bit addressing, provided the combined CSA 310 is configured to operate in accordance with the second assumption listed above. Similar to the first mask gate 311, the second mask gate 312 detects the address correction circuitry is operating in 16-bit addressing mode if the communication line 352 is deasserted.

Referring back to FIG. 3, the combined CSA 310 outputs the $E\_SUM_{31-0}$ and $E\_CARRY_{31-0}$ outputs into the first adder 320 via communication lines 314 and 315 in order to produce the Effective Address along communication lines 321. In addition, the "EFF_ADDR_CARRY$_{16}$" signal is transmitted through communication lines 351 to the sum select circuit 350 for use in determining whether the calculation of the Linear Address produced a "bad" carry, as illustrated in Table C below.

Similarly, the second adder 330 receives the $L\_SUM_{31-0}$ and $L\_CARRY_{31-0}$ outputs via communication lines 316 and 317 and produces an "uncorrected Linear Address (UNLIN[31:0])" being transmitted through communication lines 361. The second adder 330 is incapable of determining whether a carry "Cout$_{16}$ signal" output signal associated with bit15 is asserted because the second adder 330 is configured so that the Cout$_{16}$ signal is always asserted per second assumption as shown in FIGS. 5 and 6.

Figure 5:
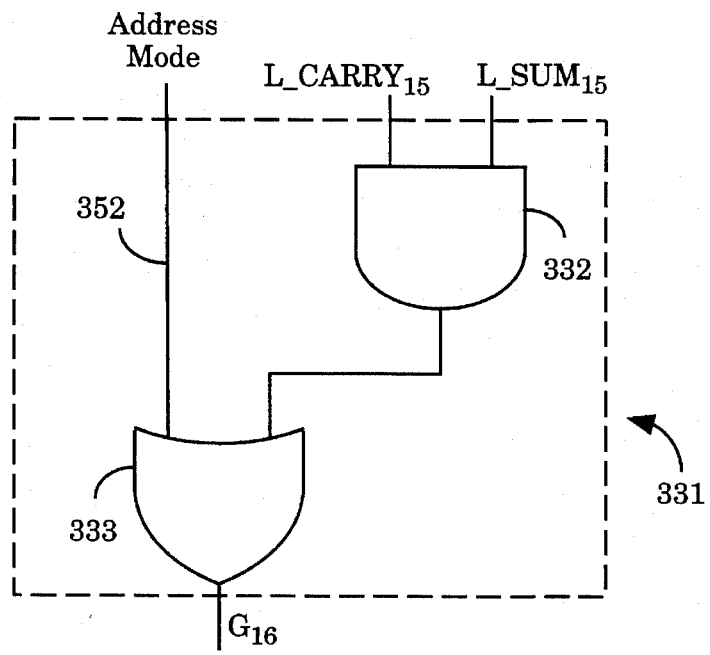
FIG. 5 is a first illustrative embodiment of a second adder of the address correction circuitry of FIG. 3 in which the second adder is configured to assert a generate ("$G_{16}$") signal for calculation of the most significant 16-bits of the uncorrected linear address.

Referring to FIG. 5, if the second adder 330 is a Kogge-Stone adder, a generating circuit 331 may be coupled to bit slice 15 to force an asserted generate "$G_{16}$" signal in accordance with the second assumption listed above. The generating circuit 331 is a first logic gate (e.g., an AND gate) 332 receiving as input $L\_CARRY_{15}$ and $L\_SUM_{15}$ outputs and a second logic gate (e.g., an OR gate) 333 producing the "$G_{16}$" signal based on a resulting signal from the first logic gate 332 and the Address Mode signal via communication line 352. The asserted "$G_{16}$" signal may effect the sums of the most significant bits "UNLIN[31:16]" produced by the second adder 330.

Figure 6:
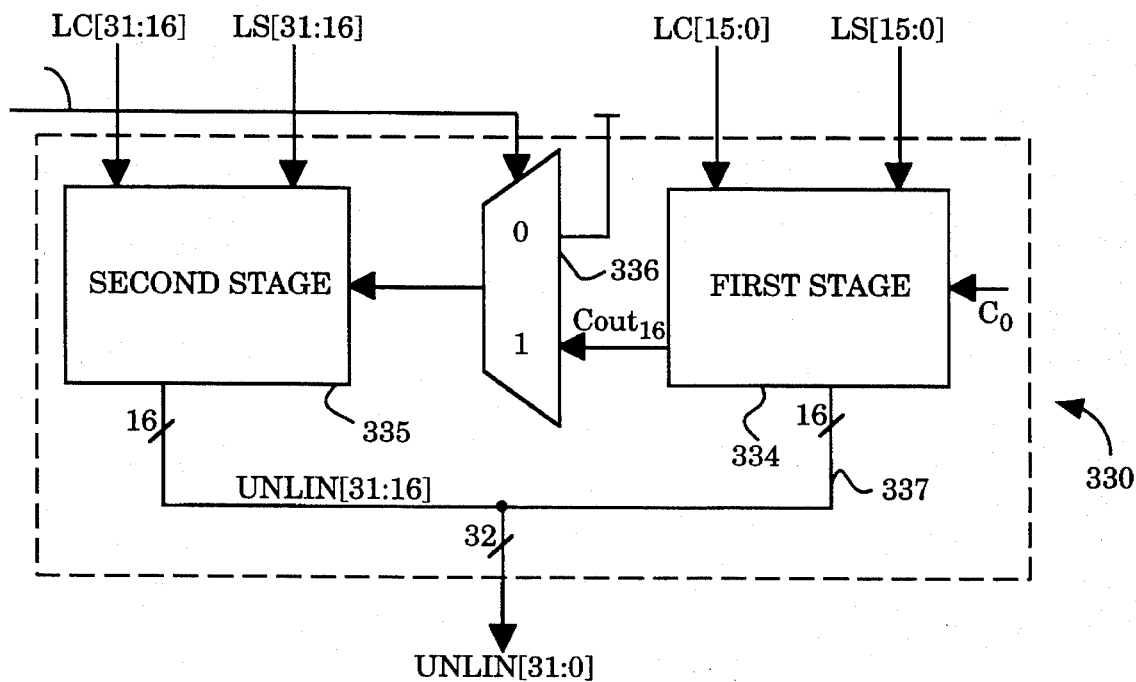
FIG. 6 is an illustrative embodiment of bit slice15 of the second adder configured to assert the $G_{16}$ signal between circuitry for calculation of the most significant 16-bits of the uncorrected linear address.

Referring now to FIG. 6, the second adder 330, differing from the Kogge-Stone adder of FIG. 5, also include a first stage 334, a second stage 335 and a multiplexing element 336. The second stage 335 receives the most significant 16-bits of the L_SUM and L_CARRY outputs (i.e., $LSUM_{16}$–$LSUM_{31}$ or "LS[31:16]" and $L\_CARRY_{16}$–$L\_CARRY_{31}$ or "LC[31:16]") while the first stage 334 receives the least significant 16-bits of the L_SUM and L_CARRY outputs (i.e., $LSUM_0$–$LSUM_{15}$ or "LS[15:0]" and $L\_CARRY_0$–$L\_CARRY_{15}$ or "LC[15:0]").

More specifically, the first stage 334 calculates the first sixteen bits of the uncorrected Linear Address "UNLIN [15:0]" by adding corresponding sum and carry signals. The first stage 334 transfers UNLIN[15:0] through communication lines 337 and serially transfers its carry output signal, the $Cout_{16}$ signal, into a first input of the multiplexing element 336. The multiplexing element 336 includes a second input tied "high" to output a signal representative of an asserted $Cout_{16}$ signal if selected by the communication line 352. The second stage 335 outputs the uncorrected Linear Address "UNLIN[31:16]" having a value dependent on whether the output signal from the multiplexing element 336 is logic "high" or "low". The presence of the multiplexing element 336 would enable the $Cout_{16}$ signal to be used as a direct input into the sum select circuit 350 making the carry generator circuit 340 obsolete.

Referring back to FIG. 3, preferably synchronous with the UNLIN[15:0] outputs, the UNLIN[31:16] is routed to the select element 360 via communication lines 362 while UNLIN[15:0] is routed through communication lines 363 for use as a lower word of the Linear Address. In addition, LS[15:0] and LC[15:0] are transferred into the carry generator circuit 340 through communication lines 318 and 319. The carry generator circuit 340 adds corresponding L_SUM and L_CARRY outputs together to determine whether the $Cout_{16}$ signal would have been asserted for the S1–S4 inputs. Thereafter, the carry generator circuit 340 outputs the $Cout_{16}$ signal to the sum select circuit 350.

The sum select circuit 350 is conditional logic which asserts a sum select ("SUM_SEL") line 355 controlling the select element 360 if a "good" carry was generated and deasserts the SUM_SEL line 355 in the event of a "bad" carry. A "good" carry is defined as a carry which would have occurred in the conventional addressing circuitry as defined in FIG. 1 while a "bad" carry, as defined above, is a carry which the prior addressing circuit would have "masked". Examples of a "good" and "bad" carry are shown in Tables B and C listed below.

TABLE B

An Example of a "Good" Carry

| Input | BIT# | | | | |
|---|---|---|---|---|---|
| | 18 | 17 | 16 | 15 | 14 | 13 |
| S1 | | 0 | 0 | 1 | 0 | 0 |
| S2 | | 0 | 0 | 0 | 0 | 0 |
| S3 | | 0 | 0 | 0 | 0 | 0 |
| S4 | | 1 | 1 | 1 | 0 | 0 |
| LIN_ADDR | 1 | 0 | 0 | 0 | 0 | 0 |
| EFF_ADDR | 0 | 0 | 0 | 1 | 0 | 0 |
| S4 | 0 | 1 | 1 | 1 | 0 | 0 |
| LIN_ADDR | 1 | 0 | 0 | 0 | 0 | 0 |

TABLE C

An Example of a "Bad" Carry

| Input | BIT# | | | | |
|---|---|---|---|---|---|
| | 18 | 17 | 16 | 15 | 14 | 13 |
| S1 | 0 | 0 | 0 | 1 | 0 | 0 |
| S2 | 0 | 0 | 0 | 1 | 0 | 0 |
| S3 | 0 | 0 | 0 | 0 | 0 | 0 |
| S4 | 0 | 0 | 1 | 1 | 0 | 0 |
| LIN_ADDR | 0 | 1 | 0 | 1 | 0 | 0 |
| EFF_ADDR | 0 | 0 | 0 | 0 | 0 | 0 |
| S4 | 0 | 0 | 1 | 1 | 0 | 0 |
| LIN_ADDR | 0 | 0 | 1 | 1 | 0 | 0 |

The sum select circuit 350 receives inputs from the combined CSA 310, the first adder 320, external logic indicating 16-bit or 32-bit addressing and the carry generator 340 through communication lines 351–354, respectively. More particularly, the combined CSA 310 transfers the $UL\_CARRY_{16}$ output into the sum select circuit 350 via communication line 353 while the first adder 320 transfers the $EFF\_ADDR\_CARRY_{16}$ via communication line 351. In addition, logic external to the address correction circuitry transfers the Address Mode signal through communication line 352 indicates to the combined CSA 310 and the second adder 330 that the processor is operating in 16-bit addressing mode. Based on this information, these adders perform operations as discussed above. Meanwhile, the carry generator circuit 340 determines whether the $Cout_{16}$ signal would have been asserted if not forced within the second adder 330 and if so, transfers an active signal through communication lines 354. These lines 351–354 provide information to the sum select circuit 350 such that it asserts the SUM_SEL line 355 according to the following function:

SUM_SEL=Address Mode+[$\overline{EFF\_ADDR\_CARRY_{16\&\&}}Cout_{16}$]+[ $\overline{EFF\_ADDR\_CARRY_{16\&\&}}UL\_CARRY_{16}$]+[$Cout_{16\&\&}$ $UL\_CARRY_{16}$]

If one of these parameters provides an active (logic "1") result, the Linear Address is correct requiring the sum select circuit 350 to assert the SUM_SEL line 355 so that the UNLIN[31:16] is passed through the select element 360 for use as the most significant bits of the Linear Address. However, if these parameters are inactive, indicating that no "good" carry was generated from the least significant 16-bits of the Linear Address, the most significant 16-bits of the segment base (i.e., "S4" input) are passed through the select element 360 for use as the most significant bits of the Linear Address.

The present invention described herein may be designed in many different embodiments evident to one skilled in the art than those described without departing from the spirit and scope of the present invention. For example, although non-inverting standard TTL logic gates have been set forth, it is contemplated that inverting standard TTL logic gates may be employed. Moreover, CMOS and/or BiCMOS technology may be used in the CSAs rather than standard TTL logic. The invention should, therefore be measured in terms of the claims which follow.

What is claimed is:

1. An integrated circuit used to generate an effective address and a linear address in parallel, the integrated circuit comprising:

a first circuit that concurrently generates the effective address and an uncorrected linear address by performing arithmetic operations on a plurality of digital inputs including a segment address, a scaled index, a displacement and a segment base;

a second circuit coupled to the first circuit, said second circuit determines whether said uncorrected linear address differs from an arithmetic sum of the effective address and the segment base; and a third circuit coupled to said first circuit and said second circuit, said third circuit outputs (i) said uncorrected linear address as the linear address if said uncorrected linear address is equal to the arithmetic sum of the effective address and the segment base and alternatively, (ii) a corrected linear address as the linear address if said uncorrected linear address differs from the arithmetic sum of the effective address and the segment base.

2. The integrated circuit according to claim 1, wherein said first circuit includes an adder element which generates (i) a first plurality of output signals including a second plurality of sum signals and a corresponding plurality of carry signals, and (ii) a third plurality of output signals including a fourth plurality of sum signals and a corresponding plurality of carry signals.

3. The integrated circuit according to claim 2, wherein said first circuit further includes a first adder that produces the effective address by arithmetically adding the second plurality of sum signals and the corresponding plurality of carry signals; and a second adder that produces the uncorrected linear address by arithmetically adding together the fourth plurality of sum signals and said corresponding plurality of carry signals.

4. The integrated circuit according to claim 3, wherein said adder element of the first circuit is a combined carry-save adder comprising a plurality of bit slice circuits oriented in parallel, each of said plurality of bit slice circuits produces at least one output signal of said first plurality of output signals used by the first adder in order to calculate one bit of the effective address, and at least one output signal of said third plurality of output signals used by the second adder in order to calculate one bit of the uncorrected linear address.

5. The integrated circuit according to claim 4, wherein said combined-carry-save adder further includes a first mask gate coupled to a sixteenth bit slice circuit, said first mask gate deasserts a $L\_CARRY_{16}$ output transmitted from said sixteenth bit slice circuit into the second adder during 16-bit addressing; and a second mask gate coupled between said sixteenth bit slice circuit and a seventeenth bit slice circuit, said second mask gate deasserts an $E\_CARRY_{16}$ output transmitted as a carry signal from said sixteenth bit slice circuit to said seventeenth bit slice circuit during 16-bit addressing.

6. The integrated circuit according to claim 3, wherein said first circuit includes a first carry-save adder coupled to said first adder, said first carry-save adder produces said first plurality of output signals based on said segment address, said scaled index and said displacement and outputs said first plurality of output signals to said first adder; and a second carry-save adder coupled to said second adder, said second carry-save adder produces said third plurality of output signals based on said segment address, said scaled index, said displacement and said segment base and outputs said third plurality of digital output signals to said second adder.

7. The integrated circuit according to claim 3, wherein said second circuit includes a sum select circuit coupled to at least said adder element and said first adder.

8. The integrated circuit according to claim 7, wherein said third circuit includes a select element having a first input receiving as input a plurality of most significant bits of said segment base and a second input receiving as input a corresponding plurality of most significant bits of the uncorrected linear address, said select element being controlled by said sum select circuit.

9. The integrated circuit according to claim 8, wherein said sum select circuit includes conditional circuitry that selects the second input of the select element if the integrated circuit is operating in a 32-bit addressing mode.

10. The integrated circuit according to claim 8, wherein said sum select circuit including conditional circuitry that selects the second input of the select element if a carry output from a preselected bit of the first adder is deasserted and a carry output from a predetermined bit of the second adder is asserted.

11. The integrated circuit device according to claim 8, wherein said sum select circuit includes conditional circuitry that selects the second input of the select element if the carry output from the preselected bit of the first adder is deasserted and a carry output from a predetermined bit of the adder element is asserted.

12. The integrated circuit device according to claim 8, wherein said sum select circuit includes conditional circuitry that selects the second input of the select element if the carry output from the predetermined bit of the adder element and the carry output from the predetermined bit of the second adder are asserted.

13. The integrated circuit according to claim 1, wherein said corrected linear address is divided into a most significant sixteen bits being equal to the most significant sixteen bits of the segment base and a least significant sixteen bits being equal to the least significant sixteen bits of the uncorrected linear address.

14. An integrated circuit for generating an effective address and a linear address in parallel, the integrated circuit comprising:

first means for concurrently generating the effective address and an uncorrected linear address by performing arithmetic operations on a plurality of digital inputs, including a segment address, a scaled index, a displacement and a segment base;

second means for determining whether said uncorrected linear address differs from an arithmetic sum of the effective address and the segment base, said second means being coupled to the first means; and third means for outputting one of (i) said uncorrected linear address as the linear address if said uncorrected linear address is equal to the arithmetic sum of the effective address and the segment base and (ii) a corrected address if said uncorrected linear address differs from the arithmetic sum of the effective address and the segment base.

15. The integrated circuit according to claim 14, wherein said first means includes a first adding means for generating (i) a first plurality of output signals, including a second plurality of sum signals and a corresponding plurality of carry signals and (ii) a third plurality of output signals including a fourth plurality of sum signals and a corresponding plurality of carry signals.

16. The integrated circuit according to claim 15, wherein said first means further includes a second adding means for producing the effective address by arithmetically adding together the second plurality of sum signals and the corresponding plurality of carry signals and a third adding means for producing the uncorrected linear address by arithmetically adding together the fourth plurality of sum signals and the corresponding plurality of carry signals.

17. The integrated circuit according to claim 16, wherein said first adding means of the first means is a combined carry-save adder comprising a plurality of bit slice circuits oriented in parallel, each of said plurality of bit slice circuits produces at least one output signal of said first plurality of output signals used by the second adding means in order to calculate one bit of the effective address, and at least one output signal of said third plurality of output signals used by the third adding means in order to calculate one bit of the uncorrected linear address.

18. The integrated circuit according to claim 17, wherein said third means includes a select element having a first input receiving a plurality of most significant bits of said segment base and a second input receiving a corresponding most significant bits from said first adding means, said select element being controlled by said sum select circuit.

19. The integrated circuit according to claim 18, wherein said sum select circuit includes conditional circuitry for selecting the second input of the select element if the integrated circuit is operating in a 32-bit addressing mode.

20. The integrated circuit according to claim 18, wherein said sum select circuit includes conditional circuitry for selecting the second input of the select element if a carry output from a preselected bit of the second adding means is deasserted and a carry output from a predetermined bit of the third adding means is asserted.

21. The integrated circuit device according to claim 18, wherein said sum select circuit includes conditional circuitry for selecting the second input of the select element if the carry output from the preselected bit of the second adding means is deasserted and a carry output from a predetermined bit of the first adding means is asserted.

22. The integrated circuit device according to claim 18, wherein said sum select circuit includes conditional circuitry for selecting the second input of the select element if the carry output from the predetermined bit of the first adding means and the carry output from the predetermined bit of the third adding means are asserted.

23. The integrated circuit according to claim 16, wherein said first adding means includes first carry-save adding means for producing said first plurality of output signals based on said segment address, said scaled index and said displacement and outputting said first plurality of output signals to said second adding means, said first carry-save adding means being coupled to said second adding means; and second carry-save adding means for producing said third plurality of output signals based on said segment address, said scaled index, said displacement and said segment base and outputting said third plurality of digital output signals to said third adding means, said second carry-save adding means being coupled to said third adding means.

24. The integrated circuit according to claim 16, wherein said second means includes a sum select circuit coupled to at least said first adding means and said second adding means.

25. The computer system comprising:

memory means storing information including a plurality of digital inputs including a base address, a scaled index, a displacement and a segment base; and processor means for processing said plurality of digital inputs, said processor means including an integrated circuit device for generating an effective address and a linear address in parallel, said integrated circuit device including first means for concurrently generating the effective address and an uncorrected linear address by performing arithmetic operations on the plurality of digital inputs, second means for determining whether said uncorrected linear address differs from an arithmetic sum of the effective address and the segment base, said second means being coupled to the first means, and third means for outputting one of (i) said uncorrected linear address as the linear address if said uncorrected linear address is equal to the arithmetic sum of the effective address and the segment base and (ii) a corrected address if said uncorrected linear address differs from the arithmetic sum of the effective address and the segment base; and bus means, coupled to said processor means and said memory means, for providing a communication path between said processor means and said memory means.

26. The integrated circuit according to claim 25, wherein said first means includes a first adding means for generating (i) a first plurality of output signals, including a second plurality of sum signals and a corresponding plurality of carry signals and (ii) a third plurality of output signals including a fourth plurality of sum signals and a corresponding plurality of carry signals.

27. The integrated circuit according to claim 26, wherein said first means further includes a second adding means for producing the effective address by arithmetically adding together the second plurality of sum signals and the corresponding plurality of carry signals and a third adding means for producing the uncorrected linear address by arithmetically adding together the fourth plurality of sum signals and the corresponding plurality of carry signals.

28. The integrated circuit according to claim 27, wherein said first adding means of the first means is a combined carry-save adder comprising a plurality of bit slice circuits oriented in parallel, each of said plurality of bit slice circuits produces at least one output signal of said first plurality of output signals used by the second adding means in order to calculate one bit of the effective address, and at least one output signal of said third plurality of output signals used by the third adding means in order to calculate one bit of the uncorrected linear address.

29. The integrated circuit according to claim 27, wherein said first adding means includes first carry-save adding means for producing said first plurality of output signals based on said segment address, said scaled index and said displacement and outputting said first plurality of output signals to said second adding means, said first carry-save adding means being coupled to said second adding means; and second carry-save adding means for producing said third plurality of output signals based on said segment address, said scaled index, said displacement and said segment base and outputting said third plurality of digital output signals to said third adding means, said second carry-save adding means being coupled to said third adding means.

30. The integrated circuit according to claim 27, wherein said second means includes a sum select circuit coupled to at least said first adding means and said second adding means.

31. The integrated circuit according to claim 30, wherein said third means includes a select element having a first input receiving a plurality of most significant bits of said segment base and a second input receiving a corresponding plurality of most significant bits from said first adding means, said select element being controlled by said sum select circuit.

32. The integrated circuit according to claim 31, wherein said sum select circuit includes conditional circuitry for selecting the second input of the select element if the integrated circuit is operating in a 32-bit addressing mode.

33. The integrated circuit according to claim 31, wherein said sum select circuit includes conditional circuitry for selecting the second input of the select element if a carry output from a preselected bit of the second adding means is deasserted and a carry output from a predetermined bit of the third adding means is asserted.

34. The integrated circuit device according to claim 31, wherein said sum select circuit includes conditional circuitry for selecting the second input of the select element if the carry output from the preselected bit of the second adding means is deasserted and a carry output from a predetermined bit of the first adding means is asserted.

35. The integrated circuit device according to claim 31, wherein said sum select circuit includes conditional circuitry for selecting the second input of the select element if the carry output from the predetermined bit of the first adding means and the carry output from the predetermined bit of the third adding means are asserted.

36. The computer system comprising:
 a memory element that contains information including a plurality of digital inputs including a base address, a scaled index, a displacement and a segment base;
 a processor that processes said plurality of digital inputs, said processor including an integrated circuit device for generating an effective address and a linear address in parallel including
  a first circuit that concurrently generates the effective address and an uncorrected linear address by performing arithmetic operations on a plurality of digital inputs, including a segment address, a scaled index, a displacement and a segment base,
  a second circuit coupled to the first circuit, said second circuit determines whether said uncorrected linear address differs from an arithmetic sum of the effective address and the segment base, and
  a third circuit coupled to said first circuit and said second circuit, said third circuit outputs (i) said uncorrected linear address as the linear address if said uncorrected linear address is equal to the arithmetic sum of the effective address and the segment base and alternatively, (ii) a corrected linear address as the linear address; and
 a bus, coupled to said processor and said memory element, for providing a communication path between said processor and said memory element.

37. The integrated circuit according to claim 36, wherein said first circuit includes an adder element which generates (i) a first plurality of output signals including a second plurality of sum signals and a corresponding plurality of carry signals and (ii) a third plurality of output signals including a fourth plurality of sum signals and a corresponding plurality of carry signals.

38. The integrated circuit according to claim 37, wherein said first circuit further includes
 a first adder that produces the effective address by arithmetically adding together the second plurality of sum signals and the corresponding plurality of carry signals; and
 a second adder that produces the uncorrected linear address by arithmetically adding together the fourth plurality of sum signals and the corresponding plurality of carry signals.

39. The integrated circuit according to claim 38, wherein said adder element of the first circuit is a combined carry-save adder comprising a plurality of bit slice circuits oriented in parallel, each of said plurality of bit slice circuits produces at least one output signal of said first plurality of output signals used by the first adder in order to calculate one bit of the effective address, and
 at least one output signal of said third plurality of output signals used by the second adder in order to calculate one bit of the uncorrected linear address.

40. The integrated circuit according to claim 37, wherein said second circuit includes a sum select circuit coupled to at least said adder element, said first adder and said second adder.

41. The integrated circuit according to claim 40, wherein said third circuit includes a select element having a first input receiving a plurality of most significant bits of said segment base and a second input receiving a corresponding plurality of most significant bits from said first circuit, said select element being controlled by said sum select circuit.

42. The integrated circuit according to claim 41, wherein said sum select circuit includes conditional circuitry that selects the second input of the select element if the integrated circuit is operating in a 32-bit addressing.

43. The integrated circuit according to claim 41, wherein said sum select circuit includes conditional circuitry that selects the second input of the select element if a carry output from a preselected bit of the first adder is deasserted and a carry output from a predetermined bit of the second adder is asserted.

44. The integrated circuit device according to claim 41, wherein said sum select circuit includes conditional circuitry that selects the second input of the select element if the carry output from the preselected bit of the first adder is deasserted and a carry output from a predetermined bit of the adder element is asserted.

45. The integrated circuit device according to claim 41, wherein said sum select circuit includes conditional circuitry that selects the second input of the select element if the carry output from the predetermined bit of the adder element and the carry output from the predetermined bit of the second adder are asserted.

46. A method for correctly calculating a linear address and an effective address in parallel, said method comprising the steps of:
 a) performing arithmetic operations on a segment address input, a scaled index input and a displacement input to produce an effective address;
 b) performing arithmetic operations on the segment address input, the scaled index input, the displacement input and a segment base input to produce an uncorrected linear address, said step (b) being performed concurrently with step (a);
 c) determining whether the uncorrected linear address differs from an arithmetic sum of said effective address and the segment base;
 d) outputting the linear address, wherein
  the linear address is equal to the uncorrected linear address if the uncorrected linear address is equal to the arithmetic sum of the effective address and the segment base, and alternatively
  the linear address is equal to a lower sixteen bits of the uncorrected address appended to an upper sixteen bits of the segment base.

* * * * *

UNITED STATES PATENT AND TRADEMARK OFFICE
CERTIFICATE OF CORRECTION

PATENT NO. : 5,612,911
DATED : March 18, 1997
INVENTOR(S) : Mark A. Timko It is certified that error appears in the above-identified patent and that said Letters Patent is hereby corrected as shown below:

In column 2 at line 35 delete "t" and insert --the most significant 16-bits of the--

Signed and Sealed this

Twenty-second Day of July, 1997

Attest:

BRUCE LEHMAN

Attesting Officer

Commissioner of Patents and Trademarks